(12) United States Patent
Young et al.

(10) Patent No.: US 7,949,555 B2
(45) Date of Patent: May 24, 2011

(54) TARIFF GENERATION, INVOICING AND CONTRACT MANAGEMENT

(76) Inventors: Simon Venn Young, Ponsonby (NZ); Andrew Bryan Philpott, Mt. Albert (NZ)

( * ) Notice: Subject to any disclaimer, the term of this patent is extended or adjusted under 35 U.S.C. 154(b) by 0 days.

(21) Appl. No.: 12/479,385

(22) Filed: Jun. 5, 2009

(65) Prior Publication Data

US 2009/0307059 A1 Dec. 10, 2009

Related U.S. Application Data

(63) Continuation of application No. 10/311,846, filed as application No. PCT/NZ01/00116 on Jun. 22, 2001, now abandoned.

(30) Foreign Application Priority Data

Jun. 22, 2000 (NZ) .......................... 505358

(51) Int. Cl.
    *G06F 17/30* (2006.01)
(52) U.S. Cl. .............. 705/10; 705/400; 705/31; 705/52; 705/35; 705/37
(58) Field of Classification Search .................... 705/29, 705/35, 40; 370/252; 379/114
    See application file for complete search history.

(56) References Cited

U.S. PATENT DOCUMENTS

| | | | |
|---|---|---|---|
| 4,218,737 A | 8/1980 | Buscher et al. | |
| 4,405,987 A | 9/1983 | Spalti | |
| 4,654,588 A | 3/1987 | Munday | |
| 4,697,182 A | 9/1987 | Swanson | |
| 5,142,566 A | 8/1992 | Meschi | |
| 5,289,362 A | 2/1994 | Liebl et al. | |
| 5,430,430 A | 7/1995 | Gilbert | |
| 5,566,084 A | 10/1996 | Cmar | |
| 5,616,902 A | 4/1997 | Cooley et al. | |
| 5,799,072 A * | 8/1998 | Vulcan et al. | ............ 379/114.02 |
| 5,848,138 A | 12/1998 | Sarpola et al. | |
| 5,894,422 A | 4/1999 | Chasek | |
| 6,041,308 A | 3/2000 | Walker et al. | |
| 6,078,652 A | 6/2000 | Barak | |
| 6,201,956 B1 | 3/2001 | Tehan | |
| 6,591,253 B1 | 7/2003 | Dinkin et al. | |
| 7,319,673 B1 * | 1/2008 | Briscoe et al. | ................ 370/252 |

FOREIGN PATENT DOCUMENTS

DE 198 14 228 3/1998

(Continued)

OTHER PUBLICATIONS

Allen, "Going Virtual: Utilities and The E-Business Revolution," *Electric Light and Power*, pp. 17-18, (2000), USA.

(Continued)

*Primary Examiner* — Vanel Frenel
(74) *Attorney, Agent, or Firm* — Foley & Lardner LLP (57) ABSTRACT

A computer-implemented method of supplying a tariff to a tariff recipient, the method comprising the steps of: a) receiving one or more cost curves from one or more suppliers, each cost curve being indicative of variations in the cost of a product or service expected by a respective associated supplier over time; b) receiving a load curve, the load curve being indicative of expected o variations in consumption of the product or service over time; c) calculating a tariff from the load curve received in step b) and the >cost curve received in step a) in accordance with a predetermined algorithm; and d) transmitting the tariff calculated in step c) to the tariff recipient.

31 Claims, 8 Drawing Sheets

FOREIGN PATENT DOCUMENTS

| EP | 0 571 889 | 12/1993 |
|----|-----------|---------|
| GB | 2 258 052 | 1/1993 |
| WO | WO 97/06442 | 2/1997 |
| WO | WO 98/38844 | 9/1998 |
| WO | WO-98/52057 | 11/1998 |
| WO | WO 98/54591 | 12/1998 |
| WO | WO-99/05532 | 2/1999 |
| WO | WO-99/18553 | 4/1999 |

OTHER PUBLICATIONS

Carle, et al., "Tariff Dependent Error Control for Heterogeneous Real-Time Multicast Services," *GMD Fokus*, pp. 1-12, Germany.

Causey, "Trading Goes From Pits to Bits," Utilities it, pp. 18-23, (2000), USA.

Spiewak, "Power Marketing: Price Creation in Electricity Markets," *Power Marketers Yearbook*—1966, pp. 65-75, (1997), The Power Marketing Association, USA.

Wooley, "Report to Utility Services Committee," Report 00.847, File B/1/6/1, pp. 1-6, (2000), The Wellington Regional Council, New Zealand.

"About eBid," [online]. [Retrieved on Apr. 10, 2000]. Retrieved from the Internet: <URL: www.energy.com/eBID/AboutEbid.asp>.

"Billing Management," [online]. [Retrieved on Apr. 10, 2000]. Retrieved from the Internet: <URL: www.enerlink.com/products/supplierProducts/billManagement/page_billmanage.html>.

"Details: usource, A Better Way to Buy Energy," [online]. [Retrieved on0 Apr. 17, 2000]. Retrieved from the Internet: <URL: www.unitil/details_main.htm>.

"EnergyOn.com Launches Revolutionary New Web Site Which Makes Ohio Natural Gas Deregulation Participation Fast and Easy," [online]. [Retrieved on Apr. 10, 2000]. Retrieved from the Internet: <URL: www.energyon.com/release.cfm?release=yahoo_0805.cfm>.

"Energy Traders and Sellers," [online]. [Retrieved on Apr. 26, 2000]. Retrieved from the Internet: <URL: www.enermetrix.com/traders.htm>.

"Google Search: Multicast Workshop Braunschweig," [online]. [Retrieved on Apr. 11, 2000]. Retrieved from the Internet: <URL: www.google.co.nz/search?q=Multicast+Workshop+ Braunschweig&hl=en&lr=>.

"Home Page of the GloNe Competence Center," [online]. [Retrieved on Apr. 11, 2000]. Retrieved from the Internet: <URL: www.fokus.gmd.de/research/cc/glone/content.html>.

"How it Works," [online]. [Retrieved on Apr. 17, 2000]. Retrieved from the Internet: <URL: www.unitil.com/unitil/howitworks_main.htm>.

"Introducing Derceto 3.0: Water Distribution Optimization Software for Windows 95/98/NT/2000," [online]. [Retrieved on Apr. 11, 2000]. Retrieved from the Internet: <URL: www.derceto.com/home.html>.

"Overview," [online]. [Retrieved on Apr. 17, 2000]. Retrieved from the Internet: <URL: www.unitil.com/unitil/uoverview_main.htm>.

"Power Trading Takes Off." (Ken Silverstein, sr. ed., Utility Business 2000).

Publications on Generic Charging and Accounting (GenCA), [online]. [Retrieved on Apr. 11, 2000]. Retrieved from the Internet: <URL: www.fokus.gmd.de/research/cc/glone/research/genca/content.html>.

The OmniOptomizer, [online]. [Retrieved on Nov. 24, 2000]. Retrieved from the Internet: <URL: www.omnichoice.com/faq.asp>.

The OmniOptomizer, [online]. [Retrieved on Nov. 24, 2000]. Retrieved from the Internet: <URL: www.omnichoice.com/optimizer.asp>.

* cited by examiner

TARIFF GENERATION, INVOICING AND CONTRACT MANAGEMENT

This Application is a Continuation of U.S. patent application Ser. No. 10/311,846, filed Jun. 9, 2003, which is a National Phase Application of PCT/NZ01/00116, filed Jun. 22, 2001, which claims priority from New Zealand Patent Application 505358, filed Jun. 22, 2000. The entire contents of the aforementioned applications are incorporated herein by reference.

The present invention relates to a system for calculating and transmitting tariffs to tariff recipients. The system is able to be deployed in a computer network environment. The invention also relates to improvements in invoicing and contract management.

The invention can be used in connection with the supply of a variety of products or services, such as electricity, water, gas or mobile phone or internet usage. These products are typically associated with network industries. This application provides detailed examples as to how it could be applied in the electricity industry.

In the newly deregulated electricity market it is becoming increasingly important for electricity purchasers to 'shop around' amongst a number of electricity suppliers in order to find the best deal.

One method of doing this is a 'reverse auction'. In a reverse auction, a Request For Proposal (RFP) from the purchaser is sent to a number of suppliers who review the RFP, and submit bids to the purchaser. The purchaser can then review the rival bids, and select one of the suppliers accordingly.

A problem with a conventional reverse auction is that it can be difficult for the purchaser to make meaningful comparisons between the rival bids, each of which may involve different conditions and pricing structures. As a result the purchaser may choose a bid which turns out to be more expensive than other bids. It is an object of the present invention to address this problem, or at least to provide the public with a useful alternative.

A first aspect of the invention provides a computer-implemented method of supplying a tariff to a tariff recipient, the method comprising the steps of:
a) receiving one or more cost curves from one or more suppliers, each cost curve being indicative of variations in the cost of an associated product or service expected by a respective associated supplier over time;
b) receiving a load curve, the load curve being indicative of expected variations in consumption of the product or service over time;
c) calculating a tariff from the load curve received in step b) and the cost curve received in step a) in accordance with a predetermined algorithm; and
d) transmitting the tariff calculated in step c) to the tariff recipient.

By calculating the tariff on the basis of the cost curve and the load curve, the invention enables the tariff recipient to easily compare a number of tariffs received from one or more sources.

The invention may be used to calculate a tariff for a product such as electricity, gas or water, or may be used to calculate a tariff for a service such as mobile telephone or internet usage. The invention will be described below with reference to electricity tariffs, but it will be understood that the invention is equally useful for other products or services.

The method of the first aspect of the invention is typically performed by a central processor, which may be distributed over a number of physical locations.

Typically the tariff is displayed to the tariff recipient, for instance on a computer screen or in a hard printout.

The supplier may be one of a variety of entities—for instance a generator, marketer or retailer of the product or service. The tariff recipient may be a purchaser, such as the ultimate end-user of the product or service, or may be a marketer or retailer. Alternatively the tariff recipient may be some intermediary, such as a client or a buying group which aggregates a number of individual load curves into one large one.

In its most general form the algorithm can be considered as a 'black box' type algorithm which receives a load curve and a cost curve as inputs, and outputs the tariff. In the preferred form described herein, the algorithm is described in terms of a set of mathematical models incorporating certain business rules. The business rules may relate to creation of a tariff by a supplier, and may also relate to charges associated with lines charges. The mathematical model may also include business rules associated with the structure of a tariff across time, i.e. the number and duration of fixed billing 'buckets' of time during a desired contract period. The contract period is the period of time in which a contract to supply is being sought.

The algorithm is typically transmitted to the central processor before a tariff is created, and may be stored by the central processor. This enables the algorithm to be formulated by the supplier (possibly with input from the tariff recipient and/or other third parties) before being transmitted to the central processor.

The algorithm typically includes the step of multiplying together the cost curve and the load curve.

The algorithm typically includes a minimisation step. For instance in one of the mathematical models described below, a revenue curve (comprising a plurality of revenue values) is generated by multiplying together the load curve and the cost curve, and the sum of the revenue values is minimised (subject to certain constraints).

Typically the algorithm is transmitted to the tariff recipient. The algorithm may be transmitted with the tariff, or may have been previously formulated with input from the tariff recipient. This ensures that the process is completely transparent—ie the tariff recipient can review the algorithm and determine how a respective tariff has been calculated.

The cost curve may be an equation which functionally describes the variation in cost over a particular time period. However preferably the cost curve comprises a plurality of cost curve data values. The cost curve data values may include buy rate values which represent the cost expected by the supplier for supplying the product or service. For example in the case of an electricity tariff mechanism, these buy rate values may be obtained from expected electricity spot market values.

The load curve may also be represented by an equation which describes variation in expected consumption across the contract period. However preferably the load curve comprises a plurality of expected load data values. Each expected load data value is typically indicative of the amount of product or service expected to be consumed during a respective time period. The expected load data values may be absolute values (e.g. MWh) or may be normalised values (e.g. percentage values).

Typically the load curve is received from the tariff recipient. However in some cases the load curve may be received from a source other than the tariff recipient. For instance the load curve may be received from a buying group and the tariff transmitted to an end user.

At a minimum, the method of the first aspect of the tariff setting mechanism will be only performed once—ie a single supplier submits a single cost curve, and a single tariff recipient submits a single load curve.

Alternatively a single supplier may submit a plurality of cost curves and the tariff recipient can choose between the different tariffs, each tariff having been calculated using a respective different cost curve. In this case the method typically includes the additional step of:
  e) receiving a cost curve identifier which identifies a cost curve for use in step c).

Preferably a plurality of suppliers each submit at least one cost curve and the tariff recipient can choose between the different tariffs calculated for each supplier. Alternatively a tariff (eg the lowest cost tariff) may be selected by the central processor, or by the tariff recipient's computer. Typically the method includes the additional step of:
  f) receiving a supplier identifier which identifies at least one of the suppliers, wherein a cost curve associated with the supplier identified in step f) is used to calculate the tariff in step c).

Typically step b) (receiving the load curve) is performed after step a) (receiving the cost curve). That is—the supplier submits the cost curve first without reference to a particular load curve. This can be contrasted with a reverse auction in which the supplier submits a bid in response to receipt of an RFP, which may or may not contain a load curve, from a tariff recipient. One advantage of receiving the cost curve first is that this makes the process "front-end empowering". In other words, it enables the tariff recipient to control the rate they will be charged by suitable manipulation of their tariff structure, as set out below in the second aspect of the invention. Another advantage of receiving the cost curve first is that it reduces the time lag between the tariff recipient submitting a load curve and receiving a tariff. In a conventional reverse auction the time lag between submitting an RFP and receiving a bid can be a matter of weeks.

Preferably the cost curve is saved in a store after it has been received in step a), and then retrieved from the store prior to, or during, the tariff calculation step c). However this is not essential, for instance a supplier may submit a continuous stream of cost curve data values which do not need to be stored but are updated continuously through links to electricity financial markets such as the New York Mercantile Exchange.

A second aspect of the tariff setting mechanism provides a computer implemented method of obtaining a tariff, the method comprising the steps of:
a) transmitting a first load curve to a central processor, the first load curve being indicative of expected variations in consumption of a product or service expected over time;
b) receiving a first tariff from the central processor, the first tariff being associated with the first load curve;
c) transmitting a second load curve to the central processor, the second load curve being indicative of expected variations in consumption of a product or service over time;
d) receiving a second tariff from the central processor, the second tariff being associated with the second load curve;
e) selecting the first tariff or the second tariff; and
f) transmitting a contract acceptance, the contract acceptance indicating which tariff has been accepted in step e).

The second aspect of the invention relates to the steps (typically carried out at the tariff recipient's computer) involved in selecting a preferred tariff, and setting up a contract with the supplier associated with the selected tariff.

The tariff recipient submits a number of different load curves, or aggregated load curves, and selects (or has selected for them by their computer or by the central processor) a preferred one of the tariffs. The load curves may be transmitted simultaneously, or alternatively the tariff recipient may submit the first load curve; review the first tariff, calculate the second load curve in response to the first tariff, and so on. In this way the tariff recipient can iteratively input their load curves to achieve an optimal tariff.

A problem with the "front-end empowering" nature of the invention is that the tariff recipient may submit a load curve which does not accurately reflect actual consumption during the contract period for which the tariff may have been created.

In accordance with a third aspect of the invention there is provided a computer implemented method of invoicing for the provision of a product or service, the method comprising:
a) monitoring consumption of the product or service;
b) invoicing in accordance with the monitored consumption and a tariff;
c) calculating an expected profit value in accordance with the monitored consumption;
d) calculating an actual profit value in accordance with the monitored consumption;
e) making a surcharge if the expected profit value exceeds the actual profit value; and
f) making a refund if the actual profit value exceeds the expected profit value.

The third aspect of the invention provides a means of dealing with load misrepresentation, by charging or refunding any shortfall/surplus.

According to a fourth aspect of the invention there is provided a computer implemented method of establishing a contract between a supplier and a tariff recipient for the provision of a product or service, the method comprising the steps of:
a) supplying an tariff to the tariff recipient by a method according to the first aspect of the invention
b) receiving a contract acceptance from the tariff recipient, the contract acceptance identifying a supplier;
c) transmitting a contract confirmation to the tariff recipient to acknowledge receipt of the contract acceptance in step b); and
d) forwarding the contract acceptance to the supplier identified in the contract acceptance.

The fourth aspect of the invention provides the additional feature of contract management. That is, the central processor acts as an intermediary between the supplier and tariff recipient in a contract acceptance routine.

According to a fifth aspect of the invention there is provided a method of invoicing a tariff recipient for the provision of a product or service, the method comprising establishing a contract with a tariff recipient by a method according to the fourth aspect of the invention; monitoring consumption of the product or service during a contract period; and invoicing the tariff recipient in accordance with the tariff previously supplied to the tariff recipient in step a) and the monitored consumption.

According to a sixth aspect of the invention there is provided apparatus for supplying a tariff to a tariff recipient, the apparatus comprising:
a) means for receiving one or more cost curves from one or more suppliers, each cost curve being indicative of variations in the cost of a product or service expected by a respective associated supplier over time;
b) means for receiving a load curve, the load curve being indicative of expected variations in consumption of the product or service over time;
c) means for calculating a tariff from the received load curve and the received cost curve in accordance with a predetermined algorithm; and
d) means for transmitting the calculated tariff to the tariff recipient.

According to a seventh aspect of the invention there is provided a computer system including a computer readable medium carrying a computer program, the computer program being configured to carry out the method of one or more of the first to fifth aspects of the invention.

According to an eighth aspect of the invention there is provided a computer readable medium carrying a computer program, the computer program being configured to carry out the method of one or more of the first to fifth aspects of the invention.

According to a ninth aspect of the invention there is provided a computer program configured to carry out the method of one or more of the first to fifth aspects of the invention.

The present invention will now be described by way of example with reference to the following drawings, in which.

Figure 1:
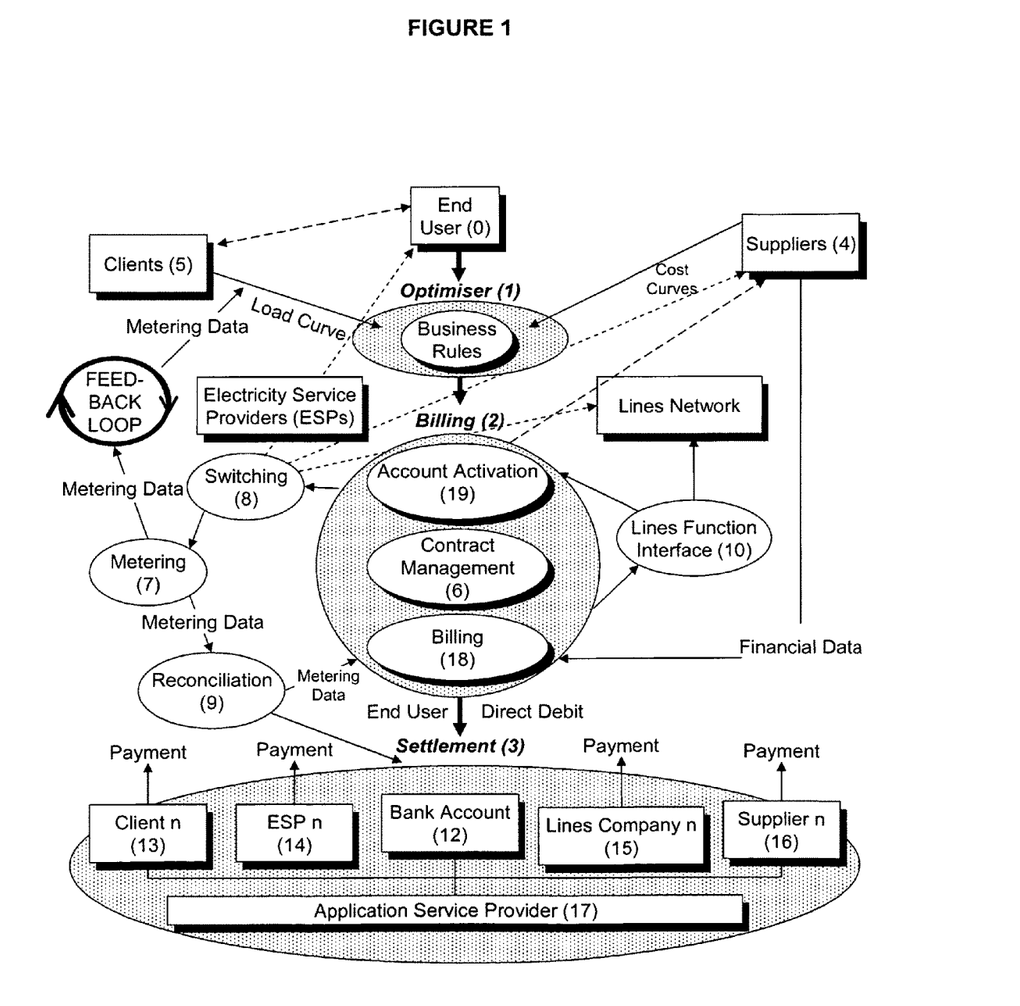
FIG. 1 is a functional flow diagram of a system.

Referring to FIG. 1, the system has three main functional modules—an optimiser module 1, a billing module 2 and a settlement module 3.

The optimiser has two sub-systems: a cost sub-system and a load sub-system.

Cost Sub-System

The cost sub-system is responsible for collecting and storing energy, distribution and other charges used in the optimiser. The costs will distill down to tariff components and rules on how the tariff components are used.

The optimiser 1 receives supplier data from suppliers 4. The suppliers 4 may be primary sources of electricity (ie generators) which are seeking to set up forward contracts for the wholesale provision of electricity during some future contract period. Alternatively the suppliers 4 may be power marketers who buy wholesale electricity and capacity on transmission lines. Alternatively the suppliers 4 may be retailers. The optimiser 1 also receives data from clients 5. The clients 5 are non-utility web entities which have pre-existing relationships with end users 0. Examples are transaction-based clients (e.g. telecommunication providers). Instead of receiving data from the end user 0 via clients 5, the optimiser 1 may receive data directly from the end users 0, as indicated in FIG. 1.

The data received from the suppliers 4 includes cost curves. An example of a cost curve is given below in column 5 of Table 1:

TABLE 1

Simple single day, Three Bucket, Single Curve Optimisation

| 1 HOUR OF THE DAY | 2 EXPECTED LOAD (MWh) | 3 EXPECTED LOAD (%) | 4 ACTUAL LOAD (MWh) | 5 BUY RATE $/MWHr | 6 SELL RATE TARIFF | 7 MARGIN $/MWHr | 8 EXPECTED PROFIT | 9 ACTUAL PROFIT |
|---|---|---|---|---|---|---|---|---|
| 1 | 25 | 1.8369 | 25 | $26.96 | $34.32 | $7.36 | $184.00 | $184.00 |
| 2 | 25 | 1.8369 | 30 | $23.13 | $34.32 | $11.19 | $279.75 | $335.70 |
| 3 | 20 | 1.4695 | 30 | $24.19 | $34.32 | $10.13 | $202.60 | $303.90 |
| 4 | 20 | 1.4695 | 35 | $23.08 | $34.32 | $11.24 | $224.80 | $393.40 |
| 5 | 23 | 1.6899 | 35 | $22.72 | $34.32 | $11.60 | $266.80 | $406.00 |
| 6 | 30 | 2.2043 | 35 | $21.27 | $34.32 | $13.05 | $391.50 | $456.75 |
| 7 | 40 | 2.9390 | 44 | $23.71 | $34.32 | $10.61 | $424.40 | $466.84 |
| 8 | 65 | 4.7759 | 70 | $34.32 | $34.32 | $0.00 | $0.00 | $0.00 |
| 9 | 85 | 6.2454 | 77 | $37.91 | $40.54 | $2.63 | $223.55 | $202.51 |
| 10 | 90 | 6.6128 | 100 | $40.31 | $40.54 | $0.23 | $20.70 | $23.00 |
| 11 | 90 | 6.6128 | 110 | $39.22 | $40.54 | $1.32 | $118.80 | $145.20 |
| 12 | 90 | 6.6128 | 110 | $39.72 | $40.54 | $0.82 | $73.80 | $90.20 |
| 13 | 88 | 6.4658 | 105 | $40.54 | $40.54 | $0.00 | $0.00 | $0.00 |
| 14 | 88 | 6.4658 | 100 | $39.90 | $40.54 | $0.64 | $56.32 | $64.00 |
| 15 | 100 | 7.3475 | 95 | $37.93 | $40.54 | $2.61 | $261.00 | $247.95 |
| 16 | 97 | 7.1271 | 56 | $35.80 | $40.54 | $4.74 | $459.78 | $265.44 |
| 17 | 85 | 6.2454 | 55 | $37.61 | $51.19 | $13.58 | $1,154.30 | $746.90 |
| 18 | 75 | 5.5107 | 54 | $37.26 | $51.19 | $13.93 | $1,044.75 | $752.22 |
| 19 | 50 | 3.6738 | 52 | $51.19 | $51.19 | $0.00 | $0.00 | $0.00 |
| 20 | 45 | 3.3064 | 44 | $41.13 | $51.19 | $10.06 | $452.70 | $442.64 |
| 21 | 40 | 2.9390 | 42 | $37.72 | $51.19 | $13.47 | $538.80 | $565.74 |
| 22 | 35 | 2.5716 | 32 | $37.23 | $51.19 | $13.96 | $488.60 | $446.72 |
| 23 | 30 | 2.2043 | 32 | $33.61 | $51.19 | $17.58 | $527.40 | $562.56 |
| 24 | 25 | 1.8369 | 25 | $32.78 | $51.19 | $18.41 | $460.25 | $460.25 |
| | 1361 | | 1393 | | | | $7,854.60 | $7,561.92 |

The cost curve shown in column 5 comprises a set of buy rate data values. Each buy rate data value is a rate in $/MWh specified by the supplier during a respective 1 hr period. For example, referring to Table 1, the supplier expects to be able to buy or generate electricity at a rate of $39.72/MWh during the period from 11 am to 12 noon and $32.78/MWh during the period between 11 pm and midnight.

A cost curve can be defined as follows: one or more cost curve components from a supplier, grouped together, to create electricity prices across time. A cost curve component can be defined as follows: a set of data having the following attributes:

unit of measure, calculated or derived e.g. kWh, kWAh;
timeframe e.g. day, working day, single half hour;
rate—monetary value;
effective period e.g. Midnight, Jul. 1, 1999 to Midnight Dec. 31, 1999;
location—grid exit point (final distribution network point before customer site)* * there may be no site applicable. For example street lighting.

Cost curve components may have coincident effective periods and be cumulative or exclusive based on rules. An example is two components with coincident effective periods, one component has a cost per kWh the other component has a connection cost per day. Another example is a component for a cost per kWh less than x kWh for the same effective period as a component for a rate per kWh greater than x kWh. Some cost curve components may have a value in every timeframe in an effective period.

An example of an energy cost curve component is:

| | |
|---|---|
| unit of measure | kWh |
| timeframe | working day |
| rate | monetary value |
| effective period | Midnight, Jul. 1, 1999 to Midnight Dec. 31, 1999 |
| location | grid exit point or network node. |

An energy cost curve component may also be a series of rates over an effective period. For example:

| | |
|---|---|
| Unit of measure | kWh |
| Location | grid point = x? |
| Effective period | midnight, Jul. 1, 1999 to midnight Dec. 31, 1999 |
| The curve has a rate for every time period within the effective period | |
| Timeframe | Jan. 09, 1999 13:30 to Jan. 09, 1999 14:00 |
| Rate | monetary value |

Suppliers can supply printed or electronic versions of their charges that can be manually or electronically inputted to the system. Data entry forms in a computer application can enable the system operators or suppliers to update cost curves. Alternatively suppliers can supply cost curves in pre-scribed file formats for importing into the system.

Lines and distribution charges are parameterised in the same way. The only variation is that they are usually constant across a Distributor defined area, typically by geographic region. So when energy component only tariffs are used, the system uses lines and distribution cost curve components from lines company suppliers.

Lines and distribution cost curve components are stored in a form readily useable in the Optimiser. They are a set of parameters needed for the optimiser to construct a tariff covering an entire contract period.

The system can also retrieve the cost curve components from suppliers who make this available. Distributors or regulatory bodies can maintain databases with regional specific charges and/or individual connection point charges. A customised translation program is used to convert charges from the supplier's format to cost curve components in the system. Every regulatory body and distributor system is different. This necessitates a customised program. Connection point information can typically include connection information mandatory for the switching module 8 in FIG. 1.

Figure 3:
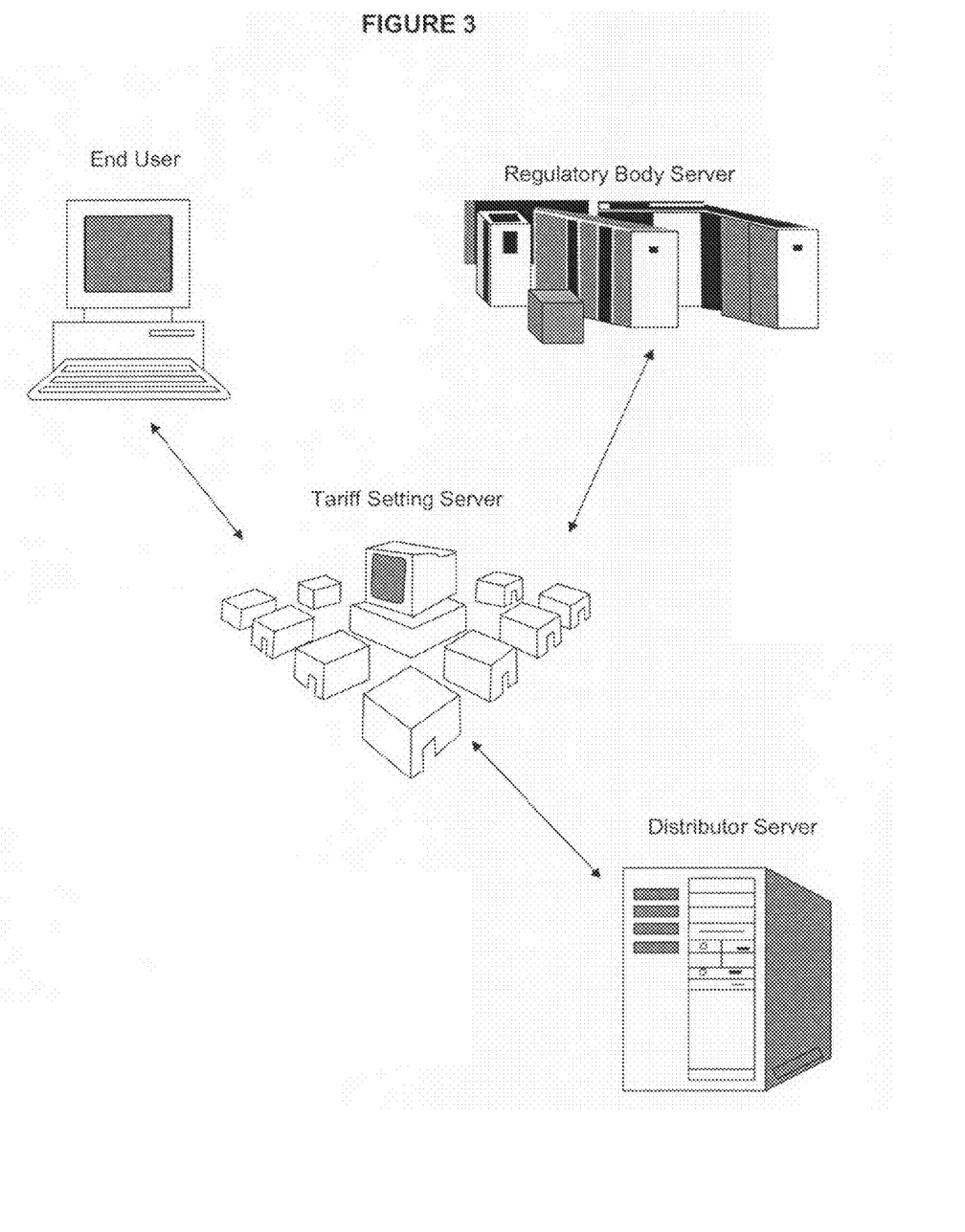
FIG. 3 illustrates the use of a distributor server and regulatory body server.

FIG. 3 illustrates the relationship with the tariff setting server (ie the optimiser 2 in FIG. 1) and the servers owned by a regulatory body and a distributor. Referring to FIG. 3, a translation program operating in the tariff setting server must communicate with the regulatory body server and/or the distributor server. This communication is handled by available protocols such as TCP/IP or HTTPS. The program may select relevant files and transfer them to the tariff setting server with FTP. Alternatively the program could perform interactive SQL to select data from the database server. This program can operate independently of end user interaction during contract management.

Clients such as internet clients can have contractual arrangements for collecting fees or commissions for contract establishment or billing. These are represented in the system in a similar way to vertical industry charges.

For example a client may have a fixed charge per contract established through the system based on contract value. This cost curve component is represented as:

| | |
|---|---|
| Unit of measure = | contract establishment |
| Timeframe = | calendar year 2001 |
| Rate = | $x |
| Rule = | contract value greater than $y |

Associated with cost curve components are rules describing their application in the optimiser. A simple example is that a Summer Energy cost curve component is only available in the summer timeframe. A more complex example would be that a Peak Demand Penalty cost curve component applies to the 10 highest demand peak during a month. A client based rule may be that all tariffs offered must be from suppliers in same geographic area as the client.

Cost curve components may have zero of more rules to observe when aggregating cost curve components into available cost curves for the optimiser to use. The rules may be represented in business objects stored in an object oriented database or parameters in a relational database table. This technique allows users interfaces and persistent storage methods to be created as the need requires. As long as the rule can be expressed in terms of data available to the system and arithmetic expressions and boolean logic applied then any rule can be implemented. In this way the system is insulated from rigid database designs.

Load Sub-System

When an end user 0 wants to obtain a tariff for a future contract to supply electrical power to the end user's site, they transmit a load curve to the client 5 (or directly to the optimiser 1).

An example of a load curve is given in column 2 of Table 1. The load curve comprises a set of expected load values (in MWh), each representing the amount of electricity that the respective end user expects to consume during a particular hour of the day. These expected load values may be based on historical consumption data associated with the end user, or may be estimates if no historical data are available. The end user may also transmit a set of normalised expected load values. The third column of Table 1 gives a typical set of normalised expected load values over a twenty four hour period.

Thus for example the end user expects to consume 6.6128% and 1.8369% of the day's power during the two one hour periods mentioned above.

The optimiser 1 includes a load sub-system which deals with various means used to measure consumption and parameters (for example peak demand) for the purpose of physical settlement and optimisation. In general they take two forms; time-of-use where interval data recorders enable actual consumption profiles across time, and custom profiles where profiling is a means of estimating consumption without having a time-of-use meter. A variation on using a custom profile is building a model of a profile based on business type and existing billed consumption.

The load sub-system handles consumption data for many commodities. For example for electricity kWh and kVAR, for water m³, for gas GJ.

Figure 4:
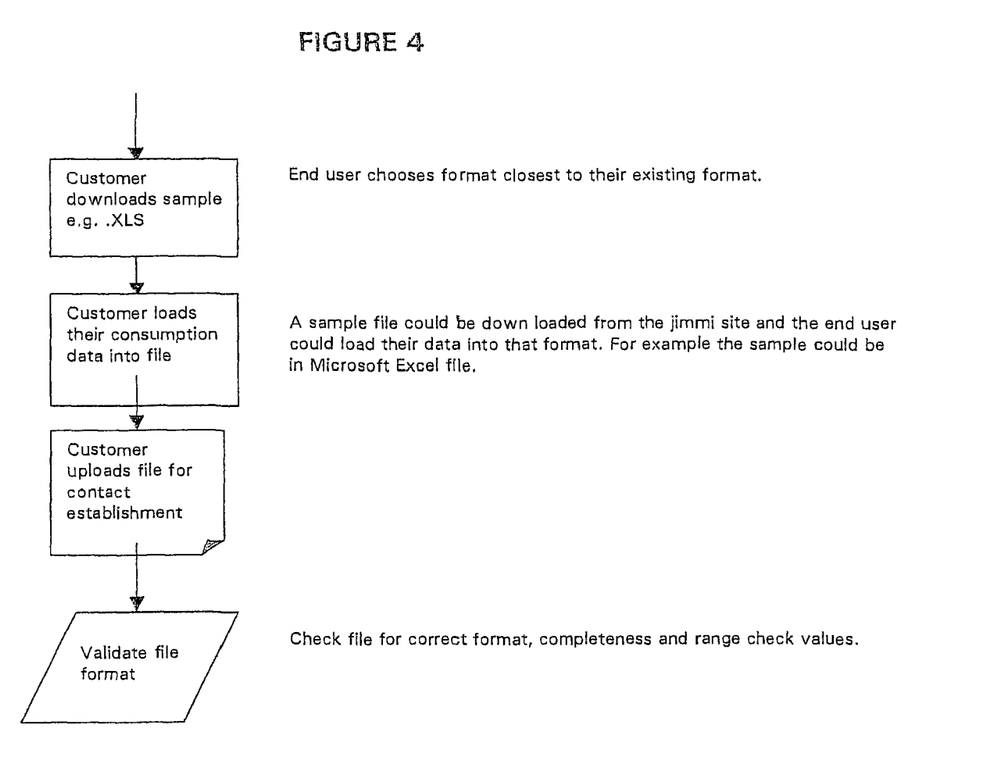
FIG. 4 is a flowchart illustrating the steps involved in submitting Time of Use data.

Time Of Use or interval data is a record of consumption or other values (measured or derived) at predetermined intervals over a period of time. Typically this data is supplied as comma separated or other forms of variable files for a period. Time of Use data can be captured from the end user during contract establishment. This data must be sent in a format that the system can process. See FIG. 4 flowchart showing the means of submitting time-of-use data Profiling is a means of estimating consumption without having a time-of-use meter. The profiling process determines the shape of the consumption curve. The shape of interest is the shape across the whole settlement period. For example a profile could exist for a 24 hour service station. This profile curve can be broken into an equivalent set of time-of-use periods.

Some profiles are Ex Post (e.g. residual profile based on the connection point). Some are Ex Ante (ahead of consumption time) and can be standard profiles or proprietary profiles.

Figure 5:
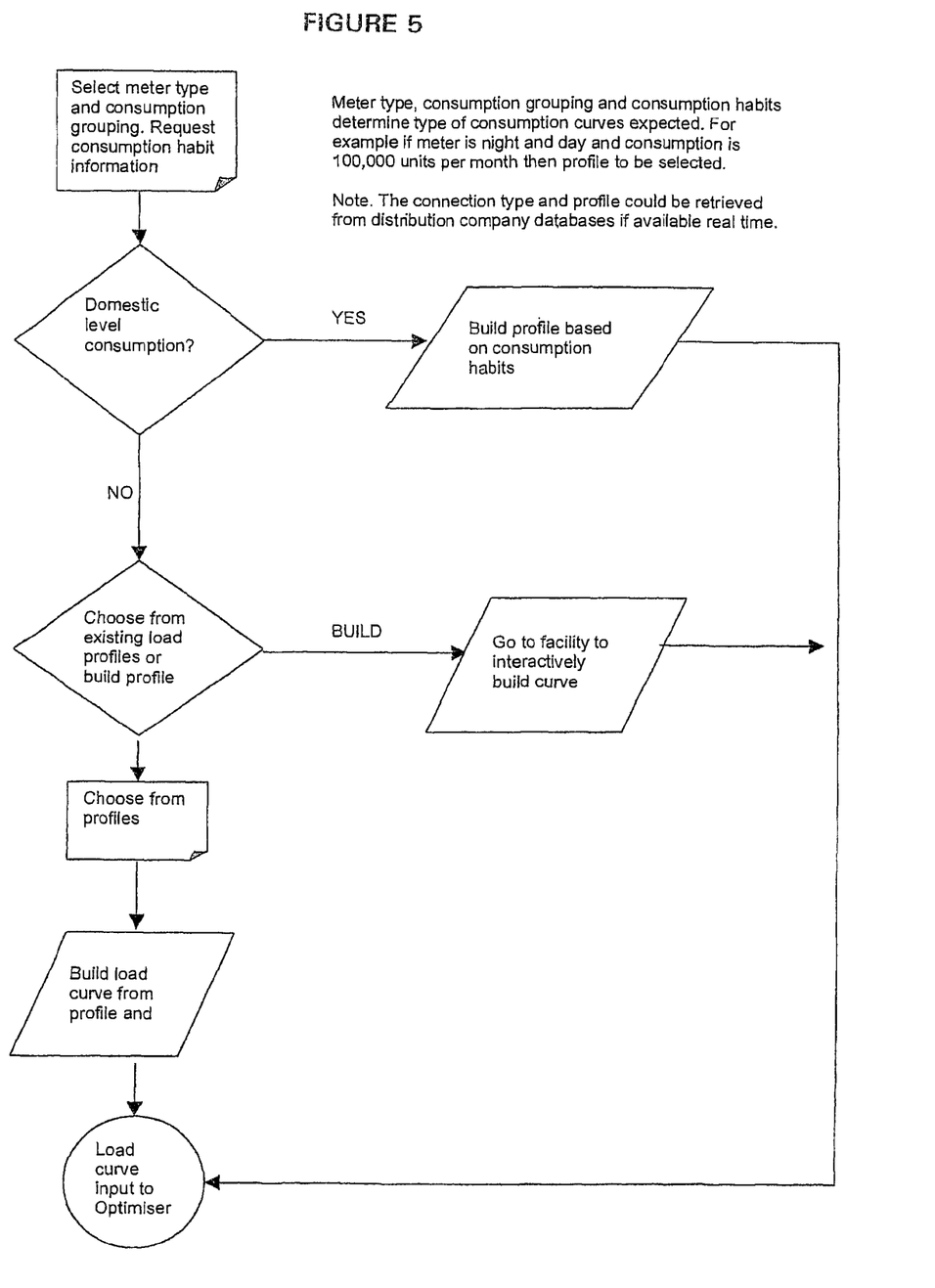
FIG. 5 is a flowchart showing the selection of an existing profile or building a profile.

See FIG. 5 Flowchart showing selection of an existing profile or building a profile.

The end user can have a facility from their browser to build a load curve that best represents their consumption. This may be useful where the end user business is not represented in the set of profiles available. It should only be used where the end user has a good understanding of their consumption curves.

An end user with a sports stadium is a good example for load profile building. They may have light loads except when used for night events. The end user is in an excellent position to estimate peak load spikes based on their calculated or measured lighting load.

Figure 6:
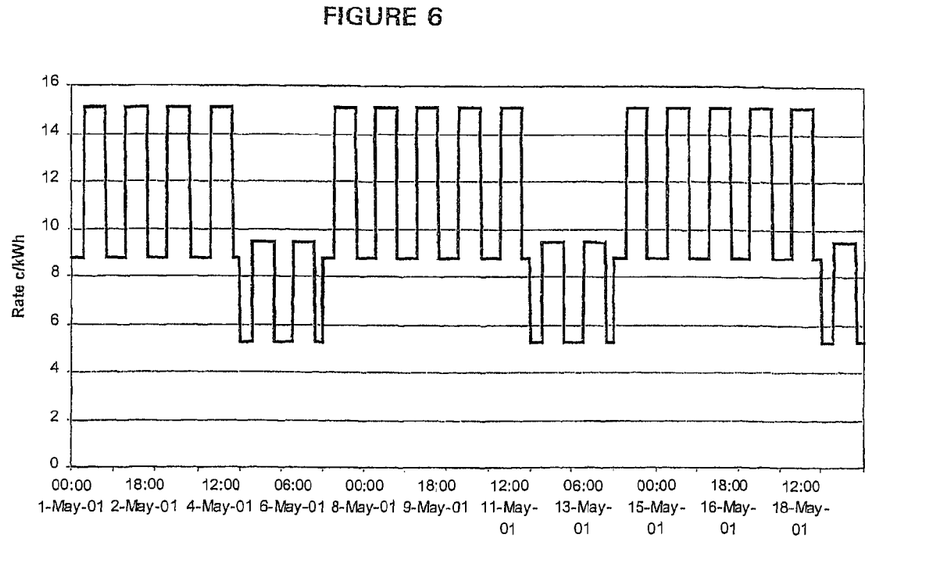
FIG. 6 shows a load curve over a period of business and non-business days.
Figure 7:
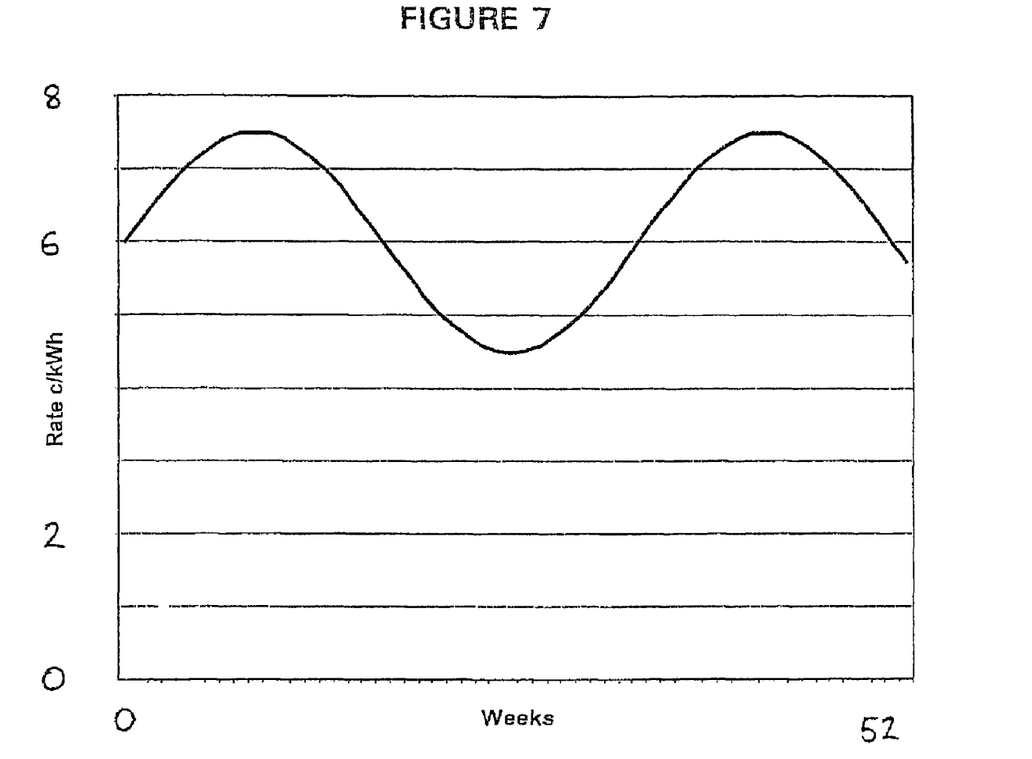
FIG. 7 illustrates seasonal influences.

Typical steps in building a load profile interactively are as follows:
1. Select starting profile curve. For example the typical business day/night-non-business day/night curve shown in FIG. 6. Curves for each 15 minute interval in a day are provided for finer or coarser granularity if necessary.
2. Select magnitude of curve values appropriate for each depiction. For example above select Business day value, business night value, non business day value and non business night value.
3. Select other period influences like monthly, bi-monthly, annual and seasonal variations. Choose appropriate curve. For instance see FIG. 7 which is a load curve illustrating seasonal influences.
4. Select magnitudes of these period influences.
5. Provide forward and back controls to enable end user to edit curves. Provide metrics like total unit consumption on curves as they are built.

Some alternative approaches are as follows:
1. Provide computer package for profile building that the end user can download and run on their computers to build profiles. The results would be uploaded to the price setting system.
2. Provide program that runs within the internet browser session to allow curves to be manipulated with user mouse movements and clicks. This can be done with Java, VRML, Flash or other available technologies.

Figure 8:
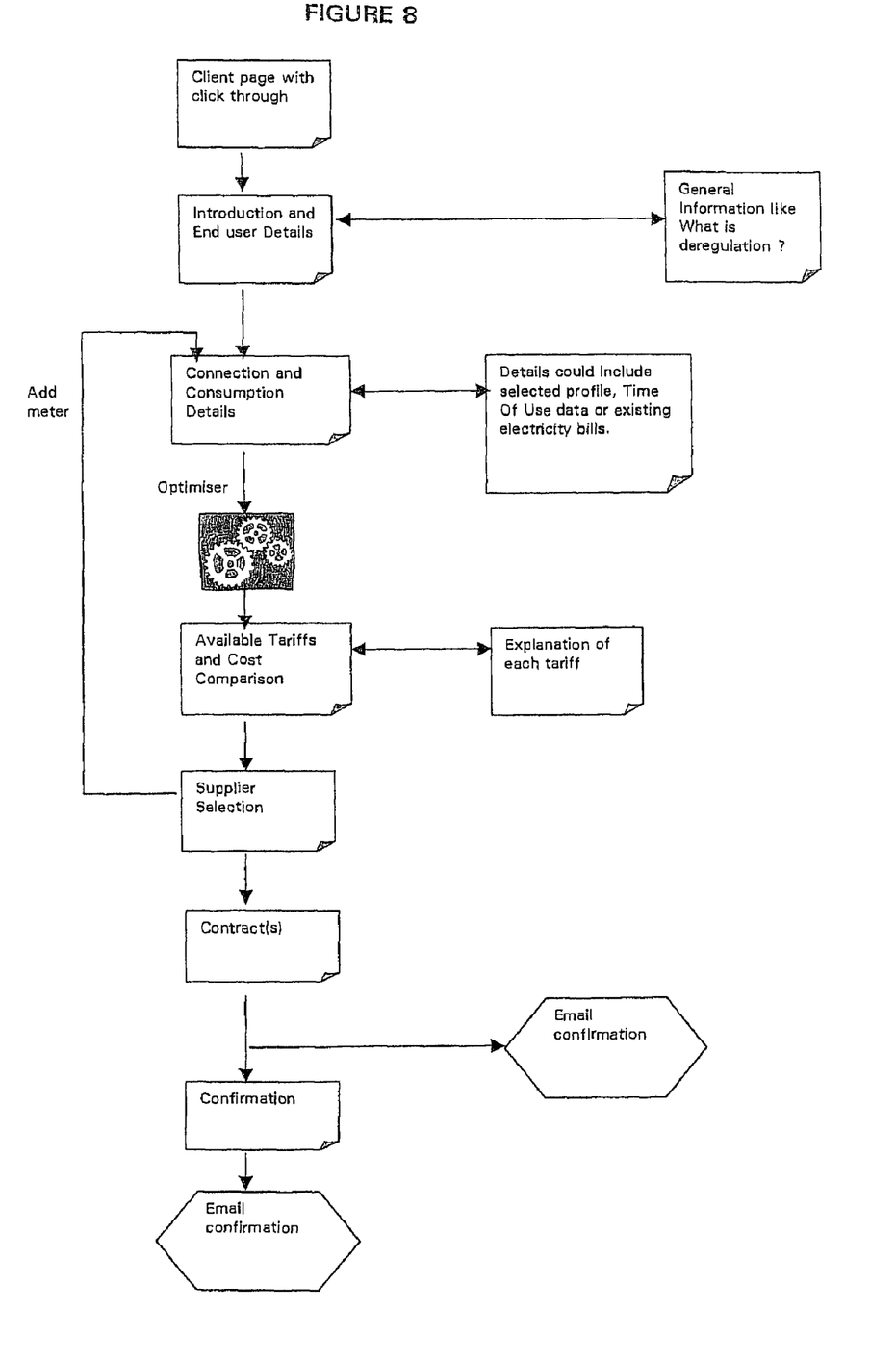
FIG. 8 is a flowchart illustrating the steps involved in tariff setting

Apart from transmitting the load curves described above, the end user will also select and transmit other data as discussed below. See FIG. 8 Schematic of Price Setting on the Internet.

(a) Select network or service territory and account. This will determine the lines and connection charges. In some algorithms, network charges may be included as constraints.

(b) Select contract period. This selects the length of period for the optimisation. A supplier may have different cost curves for different contract lengths.

(c) Select expected volume. A supplier may have different cost curves for different volumes sold. This may also involve selecting a seasonal profile.

(d) Select tariff type. Some tariffs will contain different amounts of revenue risk. A peak load profile tariff contains more revenue risk than fixed off-peak tariffs due to greater price volatility in that period.

(e) Select daily load shape. This will involve determining what type of meter is used (TOU, profile, multi-register etc). This effectively signals whether the load curve will be custom or not.

5 (f) Build a tariff structure:
select billing and settlement period. The contract period will usually be a multiple of this period. Options will probably be limited, e.g. day, week, fortnightly, monthly, bimonthly, quarterly etc. This period defines the billable 'shape' for each tariff period;
select day type. A day type is defined as a day that has a significantly different shape from other day types. The most obvious example is business days (BD) and non-business days (NBD). However, some businesses may have more definitive day types. This may include a particular day of the week;
assign day types to actual dates. For the most common, e.g. BD/NBD, the selection will already be made;
select tariff buckets. These are periods during a load shape when the price will be the same for every trading period during that bucket, e.g. peak, shoulder, off-peak, day, night;
assign hours to tariff buckets for each shape.
This then creates a tariff structure, i.e. the basis of charging for electrical energy consumption across a contract period.

(g) Build a contract shape. This divides the contract period into the billing and settlement periods, and allows for variations between these periods to be selected. This will take account of seasonal variations in load, or indeed intra-monthly variations if the billing period is weekly for example.

(h) Select tariff calculation algorithm. The optimiser has a set of previously stored tariff calculation algorithms, examples of which are described below. In this step the preferred set of algorithms for that particular end user will be identified.

The client 5 may already have other relevant details stored for the end user, (each name/address details etc) and these details may be transmitted to the optimiser 1 along with the data described above.

The end user is presented with a number of icons on the screen of their PC (see items 24,25 in FIG. 2), each icon corresponding with a particular one of the suppliers 4. When the end user clicks on a selected icon, an identifier is transmitted to the optimiser 1 which retrieves a buy rate curve associated with the selected supplier 4.

The optimiser 1 inputs the load curve (eg column 2 of Table 1) and the retrieved buy rate curve (eg column 5 of Table 1)

into an optimisation model that encapsulates business rules as constraints, and calculates a tariff using the algorithm selected in step h).

An example of a tariff is illustrated in column 6 of Table 1. The tariff of column 6 comprises a set of sell rate tariff values, each associated with a particular hour of the day. In the first 'bucket' (comprising hours 1 to 8) the sell rate tariff values are $34.32 $/MWh. In the second bucket (hours 9-16), the sell rate tariff values are $40.54 $/MWh. In the third bucket (hours 17-24) the sell rate tariff values are $51.19 $/MWh. In the example of Table 1 the values shown in column 6 have been calculated using the 'One Curve Model' algorithm described below under item 1.

The optimiser 1 can also deal with the situation where the cost curve is stored as an arithmetic function rather than a set of values in a curve. The arithmetic function describes a curve but it reduces the computational requirements of optimisation. In this case rather than multiplying all the bucket rates with all the load values, these cost values are aggregated together. The simplest case of this is where the load curve is a constant. The tariff component would be the sum of the load values for multiplied by the cost value. In these cases however the derivation is the same; the aggregation creates a forward cost curve as if the algorithm was the forward cost curve itself.

The optimiser 1 may also filter supplier tariffs based on attributes independent of load curves. Examples of this are
1. Client constraints
2. Location constraints
3. End user preferences for supplier or energy source e.g. non nuclear power
4. End user preferences for contract details like payment type.

These constraints will be secondary inputs into the invention and not an integral part of it.

The optimiser then transmits the sell rate tariff values, back to the end user 0 and/or the client 5. The end user can elect to have the tariff values displayed on screen, in a hard printout or in the form of a downloadable file such as an Excel™ file.

If the end user 0 wishes to make a comparison with other suppliers, then the end user can click on another icon and these steps are repeated.

The end user can also submit a second load curve, different to the first load curve, if none of the tariffs are satisfactory, and repeat this process until they are satisfied with the result. By this method the end user is performing a sensitivity analysis on the tariffs and can evaluate the benefits of modifying their consumption loads. Virtual Reality Modelling Language (VRML) can be used to represent multiple load curve vs tariffs.

The selection of supplier icons may be replaced by a single process where the choice of supplier is made automatically. These contract setting mechanisms may or may not be blind as to the supplier, so the end user does not know with whom they contract The optimiser described in this tariff setting mechanism can adopt a number of different market models depending on the preferences of the end user and the supplier. Here we describe several possibilities.

Examples of mathematical models used in tariff calculation
1. One Curve Model
   Suppose a supplier has a cost curve of the form $c(t), t=1, 2, \ldots, 24$ and requires that in each hour of the day the tariff exceeds this by some margin $m(t)$. Suppose that an end user has a load curve given by $l(t), t=1, 2, \ldots, 24$. Let $B_i, i=1, 2, \ldots, k$, be a collection of subsets of $\{1, 2, \ldots, 24\}$ that partition this set: i.e. $\cap B_i = \phi, \cup B_i = \{1, 2, \ldots, 24\}$. We call the subsets $B_i$ tariff buckets. The optimiser constructs a set of tariffs, $p_i, i=1, 2, \ldots, k$, satisfying certain business rules expressed as constraints. One of these might be a bound on the maximum price. Alternatively one might require that the revenue earned in tariff bucket i must not be greater than tariff bucket j multiplied by some constant $\alpha_{ij}$. Mathematically this problem is expressed as:

minimise $$\sum_{i=p}^{k} p_i \sum_{t \in B_i} l(t)$$

subject to $p_i \geq c(t) + m(t), t \in B_i, i = 1, 2, \ldots, k,$ (margin constraints)

$p_i \sum_{t \in B_i} l(t) \leq \alpha_{ij} p_j \sum_{t \in B_j} l(t), I, J = 1, 2, \ldots, k,$ (revenue in proportion)

$p_i \leq M(t), t \in B_i, i = 1, 2, \ldots, k.$ (bounds on price)

2. Dual Curve Model
   Suppose a supplier has a cost curve of the form $c(t), t=1, 2, \ldots, 24$, and will supply up to $l(t), t=1, 2, \ldots, 24$, at this rate. Let $d(t), t=1, 2, \ldots, 24$, be the rate at which they are prepared to supply above $l(t)$. (In most circumstances $d(t)$ will just be the spot price for power at t.) In the dual-curve model the supplier charges the end user a fixed amount of $$C = \sum_{t=1}^{24} c(t) l(t)$$

irrespective of the consumption of power. If the actual load $x(t)$ exceeds $l(t)$ then there is a surcharge $$D = \sum_{t=1}^{24} d(t)[x(t) - l(t)]_+ .$$

Here $[v]_+ = \max\{v, 0\}$. There is no optimisation in this model, apart from the tariff recipient choosing the supplier with what appears to be the best C+D value.

3. Probabilistic Demand Curve Model
   Suppose a supplier has a cost curve of the form $c(t), t=1, 2, \ldots, 24$. End users have load curves $l(t, \omega), t=1, 2, \ldots, 24$, $\omega \in \Omega$, where $\Omega$ is a set of scenarios for the load curve of the end users. Associated with each scenario $\omega$ is a probability $\pi(\omega)$. Let $B_i, i=1, 2, \ldots, k$, be a collection of tariff buckets. The supplier would like to minimise the expected cost faced by the tariff recipient subject to constraints that ensure that in each scenario they ensure a margin that they had charged $c(t)+m(t)$. Formally this is the following optimisation problem:

minimise $$\sum_{i=1}^{k} p_i \sum_{\omega \in \Omega} \pi(\omega) \sum_{t \in B_i} l(t, \omega)$$

-continued subject to $$\sum_{i=1}^{k} p_i \sum_{t \in B_i} l(t, \omega)[c(t) + m(t)], \omega \in \Omega,$$

(margin constraints)

$$p_i \sum_{t \in B_i} l(t, \omega) \leq \alpha_{ij} p_j \sum_{t \in B_j} l(t, \omega), i, j = 1, 2, \ldots, k, \omega \in \Omega$$

(revenue in proportion)

$$p_i \leq M(t), t \in B_i \quad i = 1, 2, \ldots, k.$$

(bounds on price)

4 Probabilistic Demand Curve Model (Total Margin)

Suppose a supplier has a cost curve of the form $c(t)$, $t=1, 2, \ldots, 24$. End users have load curves $l(t,\omega)$, $t=1, 2, \ldots, 24$, $\omega \in \Omega$, where $\Omega$ is a set of scenarios for the load curve of the end user. Associated with each scenario $\omega$ is a probability $\pi(\omega)$. Let $B_i$, $i=1, 2, \ldots, k$, be a collection of tariff buckets. The supplier would like to minimise the expected cost faced by the tariff recipient subject to constraints that ensure that in each scenario they ensure a total daily margin of M. Formally this is the following optimisation problem:

minimise $$\sum_{i=1}^{k} p_i \sum_{\omega \in \Omega} \pi(\omega) \sum_{t \in B_i} l(t, \omega)$$

subject to $$\sum_{i=1}^{k} p_i \sum_{t \in B_i} l(t, \omega) c(t) + M, \omega \in \Omega$$

(margin constraints)

$$p_i \sum_{t \in B_i} l(t, \omega), i, j = 1, 2, \ldots, k, \omega \in \Omega$$

(revenue in proportion)

$$p_i \leq M(t), t \in B_i, i = 1, 2, \ldots, k.$$

(bounds on price)

5. Call-option Model

The supplier provides a cost curve of the form $c(t), t=1, 2, \ldots, 24$ for some day in the future. The end user decides an amount of power that they would like at this price on that day, and submits a load curve $l(t), t=1, 2, \ldots, 24$ for that day. For each t the supplier computes the price $e(t)$ of a European call option on 1 megawatt of power at the exercise price of $c(t)$. The supplier then charges the end user a risk charge $$E = \sum_{t=1}^{24} e(t)l(t)$$

that gives the end user the right (but not the obligation) to purchase up to $l(t)$ MW of power in interval t at $c(t)$. Any purchases of power above $l(t)$ are charged at the spot price. The total cost to the end user for the day's power is $$P = E + \sum_{t=1}^{24} c(t)x(t) + \sum_{t=1}^{24} (d(t) - c(t))[x(t) - l(t)]_+,$$

where $[v]_+ = \max\{v, 0\}$. There is no optimisation in this model, apart from the tariff recipient choosing the supplier with what appears to be the best P value. The tariff recipient can try different $l(t)$ curves to try and compute the best deal for each supplier, but since there is uncertainty in $x(t)$ and $d(t)$, P has a probability distribution.

Call-option Model with Consumer Optimisation

This is the same as the call-option model except that the end user provides scenarios of their load and possibly correlated scenarios of the spot price. For any supplier, the optimiser then chooses $l(t)$ to minimise the expected value of P over scenarios $\omega \in \Omega$, that represent different load and price outcomes for that day. Suppose the random price on the day in question has outcomes $d(t,\omega)$, and the load curve of the tariff recipient has load outcomes $x(t,\omega)$ (typically correlated with spot price). Recall the total cost to the end user for the day's power is in any given scenario $\omega$.

$$P(\omega) = \sum_{t=1}^{24} \{e(t)l(t) + c(t)x(t, \omega) + (d(t, \omega) - c(t))[x(t, \omega) - l(t)]_+\}.$$

This gives the following two-stage stochastic optimisation problem:

$$\text{minimise} \sum_{t=1}^{24} \left[ e(t)l(t) + \sum_{\omega \in \Omega} \pi(\omega)(d(t, \omega) - c(t))y(t, \omega) \right]$$

subject to $l(t) + y(t,\omega) \geq x(t,\omega)$, $\omega \in \Omega$
$y(t,\omega) \geq 0$ $\omega \in \Omega$
$l(t) \geq 0$.

Contract Management

If no further comparisons are required, unless the optimiser makes a selection automatically, the end user selects a preferred one of the suppliers 4 (e.g. by clicking on an icon) and a contract acceptance is transmitted to the selected supplier, and passed on to a contract management module 6 within the billing module 2. An account is also set up by account activation module 19. The contract management module 6 transmits a confirmation message to the end user and a contract notification to the selected supplier 4.

An Electricity Service Provider (ESP) includes a metering module 7, switching module 8 and reconciliation module 9. Once a contract has been completed, the contract management module 6 transmits the contract data to switching module 8. The contract management module 6 also transmits the contract data to a lines function interface 10 and a billing sub-module 18.

Billing

During the contract, the metering module 7 collects the metering data (time-of-use, custom time-of-use), which is stored and processed by reconciliation module 9. In this example we shall assume that the billing period is twenty four hours. An example of twenty four hours' worth of metering data is shown in column 4 of Table 1. At the end of the twenty four hour billing period the reconciliation module 9 transmits the metering data shown in column 4 of Table 1 to the billing sub-module 18. The billing sub-module 18 also receives lines billing data from the lines function interface 10. The billing sub-module 18 then multiplies the metering data (column 4) by the sell rate tariff values (column 6) to produce a set of actual revenue values (not shown in Table 1). The billing sub-module 18 also calculates the sum of the actual revenue values to generate a total revenue value (also not shown in Table 1).

If the 'custom time-of-use' method is used, then load profiles will be assumed. These can be assumed ahead of actual consumption (ex ante) or after actual consumption based on methods such as sampling, or residual unmetered loads (ex post)

All billing data (including the total revenue value, lines billing data etc) is transmitted by the billing sub-module 18 to the end user in the form of an email or by other selected means (e.g. a downloadable file such as an Excel™ file) for display on screen or on a hard print-out.

The Billing system can also collect financial data and other non consumption data. This could be information from suppliers that they might typically include in mailed bills. It could be complete billing information for the billing system to pass directly to the end user. It could be billing information relating to other services supplied outside the contract.

Feedback Loop

By submitting an on-line forward price path for use in establishing a fixed retail contract, a supplier carries a major underlying risk: load misrepresentation. End users seeking to establish a fixed forward retail contract on-line have incentive to misrepresent their load. Load misrepresentation takes two forms;

shape risk (i.e. that the actual load curve is more coincident with pricing peaks than the expected load curve). In this circumstance suppliers have to buy more expensive electricity in order to physically settle;

magnitude risk (i.e. that the load is smaller than expected and thus revenue or annual margin is lower than expected).

Because the contract created remains fixed to one forward price path, other potentially lower cost curves may be discarded by the end user if load is overly misrepresented. Dual curves also help reduce this technical problem. Another way of dealing with this problem is through a "feedback loop". In this mechanism any shortfall or surplus in profit or revenue is recovered from (or returned to) the purchaser in the following billing periods. The exact mechanism for doing this can take a number of forms.

In its simplest form, the profit margin per MWhr calculated ex-ante with the expected load (l(t)) is applied ex-post to the actual load (●(t)) to give an expected profit with the observed load defined by $$Z = \sum_{t=1}^{24} \lambda(t) \sum_{t=1}^{24} (p(t) - c(t))l(t) / \sum_{t=1}^{24} l(t).$$

The shortfall S is defined to be the difference between Z and the profit Y that was actually received, where $$Y = \sum_{t=1}^{24} (p(t) - c(t))\lambda(t),$$

so S=Z-Y.

The shortfall (or surplus) can be charged (or refunded) as a one-off fee for the next billing period, or it can be spread over billing period as a surcharge per MWhr. Alternatively it can be spread evenly over the remainder of the contract period, and the tariff structure increased, or decreased evenly by this margin.

As an example consider a billing period of twenty four hours, with data as shown in Table 1. At the end of the first twenty four hour period the tariff recipient is billed according to their consumption during that period (column 4 of Table 1), and according to the previously agreed sell rates (column 6 of Table 1). In this example the shape of $$\sum_{t=1}^{24} (p(t) - c(t))l(t) = \$7854.60$$

the actual consumption data (column 4) differs widely from the expected load curve (column 2). Moreover the total load is 1393 MWhr as opposed to 1361 MWhr as expected. This discrepancy may result in losses being sustained by the supplier. Here Y=$7561.92. Since we have that Z=$7854.60 (1393/1361)=$8,039.28. Note that this is the profit that the supplier would have made if they had made the same profit margin per MWhr as expected when the optimisation was run ($7854.60/1361), but earned this margin on every MWhr of power sold (1393).

The shortfall in profit S=Z-Y=$8,039.28-$7561.92=$477.36. This amount is either added to the bill for the following day, or divided by the expected total load for the next twenty four hour period and added to the tariffs in column 6 of Table 1 for this period. If the contract period is longer than the billing period (say 30 days) then the shortfall can be distributed over the remaining days in the contract period. In the feedback loop mechanism the final day in the contract period will incur a shortfall or surplus to be reconciled as a washup payment, or included in the following contract period.

Observe that the feedback loop continually penalises the user for discrepancies between the expected load shape and the actual ex-post load shape that are to the disadvantage of the supplier. It also rewards the user if their misrepresented load shape gives an unexpected windfall to the supplier.

At regular intervals the optimiser is re-run to advise end users of the advantages of changing tariff or suppliers. Depending on supplier contractual arrangements supply of new optimisations to the end user may be permitted. Suppliers may permit the optimisations to include only their cost curves. During the course of the contract the end user loads are optimized against the current supplier tariffs to look for more favorable tariffs. The loads used are either the original loads captured during contract establishment or loads based on actual consumption data captured during billing.

Settlement

The settlement module 3 includes a trust account 12, and bank accounts 13-17 each associated with the clients 5, ESPs, Lines Companies 10, suppliers 4 and an Application Service Provider (ASP) which operates the modules (1-3) respectively. The billed value is direct debited from the end user's bank account by billing module 6 (after a settlement period previously specified by the end user) and paid into the trust account 12. The trust account 12 is administered by a trust account administrator who arranges for concurrent payments into the accounts 13-17.

Clients

The clients 5 will be able to access the billing data and reporting functionality such as graphical reports of consumption, and debtors information. They are also able to alter the way in which the end users receive and view their electricity billing data.

Architecture

Figure 2:
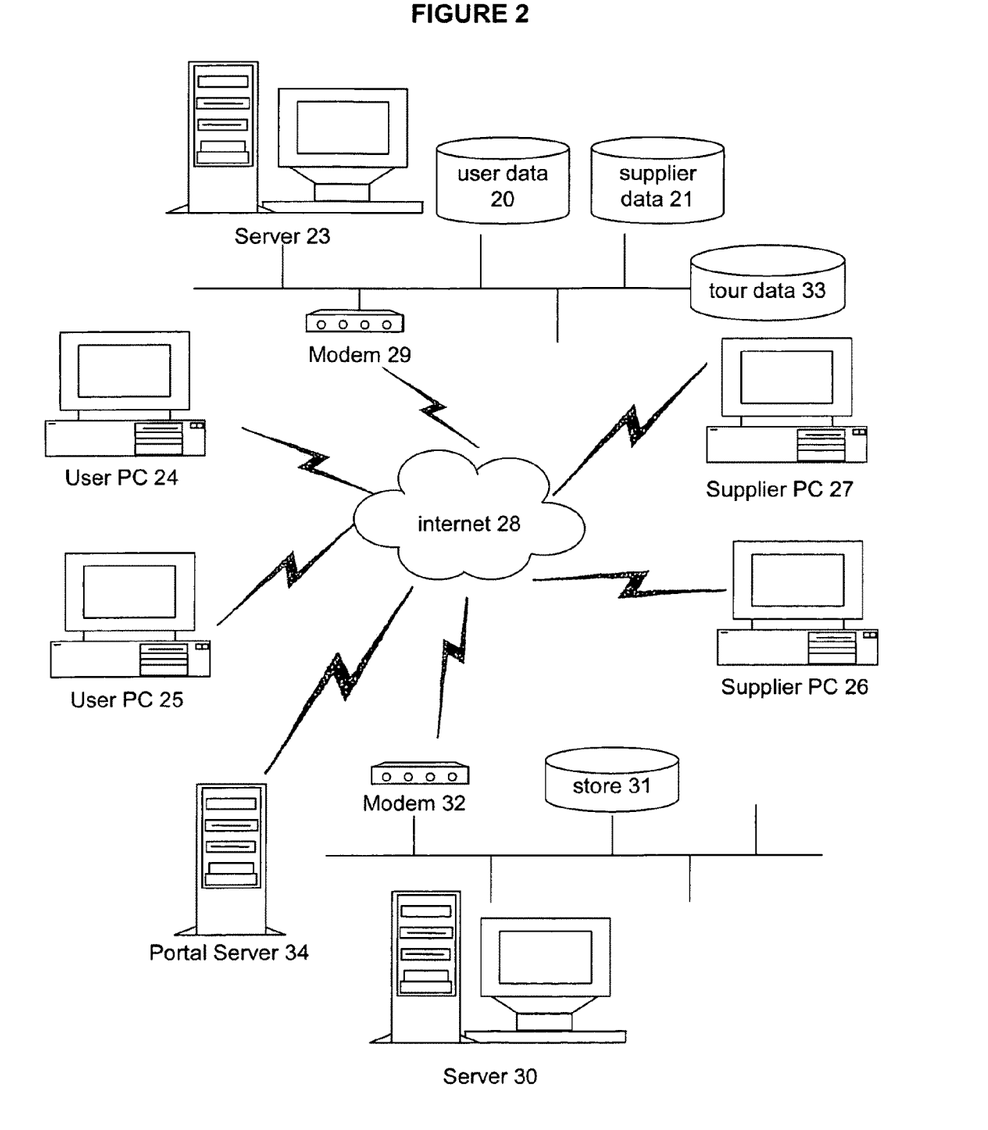
FIG. 2 illustrates a suitable system architecture for implementing the functions shown in FIG. 1.

A suitable system architecture is illustrated in FIG. 2. The ASP hosts applications at two sites—one for sales and user registration, and one for operational processing.

End user and supplier data is recorded at the sales/user registration site in stores 20,21 under control of a server 23. The data is received from end user PCs 24,25, or via a client 34, and cost curve data is received directly from supplier PCs 26,27. The communication link is completed via the internet 28 and modem 29. The server 23 also provides interactive tours for prospective users, utilising interactive data in store 33.

The functions of the optimiser module 1, billing module 2 and settlement module 3 are performed at the operational processing site by a server 30 in conjunction with a store 31 and modem 32. The majority of the system software is hosted by the ASP and stored in a computer readable medium (eg hard drive) on the server 30. Only a relatively small amount of software is stored in computer readable media associated with the end user/supplier PCs 24-27.

Every billing period a bill confirmation is automatically generated and transmitted to the end users PC 24,25. The bill confirmation in the form of an email has a hyperlink that connects the end user PC 24,25 to the billing server 30. The end user has the ability to drill down (acquire) to full billing and contract history reports for their contract. The generators/marketers/client also have the ability to drill down to full billing and contract history reports, but restricted to their contracts.

To maximize the effect of this invention, the ability to compare must be transportable across suppliers. Billing and settlement modules enable transportability to be maintained. Typically the method is performed by a central processor (typically that may be hosted by an Application Service Provider—ASP) which is remotely located from the supplier(s) and the tariff recipient. This enables the tariff recipient and supplier(s) to minimise the amount of local processing power required.

The optimiser in this system calculates tariffs for tariff recipients that meet certain conditions or business rules. One of the novel and unique aspects of this invention is that given cost data from the suppliers, and load data from the tariff recipients, the best deal for the tariff recipient can be constructed automatically by optimisation software, once the rules defining constraints on the tariffs have been set, and an objective to be optimised has been determined. On the one hand the optimisation could optimise an objective function determined by the tariff recipient subject to rules set by the supplier and tariff recipient constraining the choice of tariff. Such an objective function would typically be overall cost of supply (that the optimisation would seek to minimise). On the other hand the optimisation could maximise the revenue earned by the supplier subject to rules set mainly by the tariff recipient constraining the choice of tariff.

Although this invention has been described by way of example and with reference to possible embodiments thereof, it is to be understood that modifications and improvements may be made without departing from the spirit or scope of the invention.

The invention claimed is:

1. A computer-implemented method of supplying a tariff to a tariff recipient, the method comprising the steps of:
   a) receiving one or more cost curves from one or more suppliers, each cost curve being indicative of variations in the cost of a product or service expected by a respective associated supplier over time;
   b) receiving a load curve, the load curve being indicative of expected variations in consumption of the product or service over time;
   c) calculating, by one or more computers, a tariff from the load curve received in step b) and the cost curve received in step a) in accordance with a predetermined algorithm; and
   d) transmitting, by the one or more computers, the tariff calculated in step c) to the tariff recipient.

2. The method of claim 1, wherein the tariff comprises one or more tariff values of the general form:

$$p = c.l + m, \text{ where}$$

p is a tariff value,
c is a cost curve value,
l is a load curve value, and
m is a non-zero margin value.

3. The method of claim 2, wherein the tariff values p are calculated by minimising p.l subject to one or more predetermined business rules.

4. The method of claim 3 wherein the tariff values p are calculated by minimising p.l subject to predetermined constraints on m.

5. The method of claim 2, wherein the tariff values p are calculated by minimising p.l.pi subject to one or more predetermined business rules, where pi is a predetermined probability value.

6. The method of claim 1 wherein the predetermined algorithm calculates one or more tariff values in accordance with the equation:

$$p = c.l\max + d[l - l\max], \text{ where}$$

p is a tariff value,
c is a cost curve value,
l is a load curve value,
lmax is a maximum load value, and
d is a surcharge value.

7. The method of claim 1 wherein the predetermined algorithm calculates one or more tariff values in accordance with the equation:

$$p = e.l + c.x + (d - c)\{x - l\}_+, \text{ where}$$

p is a tariff value,
c is a cost curve value,
l is a load curve value,
e is an option value,
x is an actual load value,
d is a surcharge value, and
$[v]_+ = \max\{v, 0\}$.

8. The method of claim 1, wherein step b) is performed after step a).

9. The method of claim 1 further comprising saving the cost curve in a store after it has been received in step a), and retrieving the saved cost curve from the store prior to, or during, the tariff calculation step c).

10. The method of claim 1 wherein steps a)-d) are performed by a central processor.

11. The method of claim 1 further comprising transmitting the predetermined algorithm to the central processor before a tariff is created in step d).

12. The method of claim 1 wherein the tariff comprises a plurality of tariff values, and the method further comprises the step of summing the tariff values.

13. The method of claim 1 further comprising transmitting the predetermined algorithm to the tariff recipient.

14. The method of claim 1 wherein the cost curve comprises a plurality of cost curve values.

15. The method of claim 1 wherein the load curve comprises a plurality of load curve values.

16. The method of claim 1 wherein the load curve is received in step b) from the tariff recipient.

17. The method of claim 1 wherein step a) comprises receiving a plurality of cost curves from one or more suppliers.

18. The method of claim 17 wherein step c) comprises calculating a plurality of tariffs from the plurality of cost curves.

19. The method of claim 18 further comprising the step of selecting a preferred one of the tariffs.

20. The method of claim 17 including the additional step of:
   e) receiving a cost curve identifier which identifies one of the plurality of cost curves for use in step c).

21. The method of claim 1 wherein step a) comprises receiving cost curves from a plurality of suppliers.

22. The method of claim 21 including the additional step of:
   f) receiving a supplier identifier which identifies at least one of the suppliers, wherein a cost curve associated with the supplier identified in step f) is used to calculate the tariff in step c).

23. A computer implemented method of establishing a contract between a supplier and a tariff recipient for the provision of a product or service, the method comprising the steps of:
   a) supplying a tariff to the tariff recipient by a method according to claim 1;
   b) receiving a contract acceptance from the tariff recipient, the contract acceptance identifying a supplier;
   c) transmitting a contract confirmation to the tariff recipient to acknowledge receipt of the contract acceptance in step b); and
   d) forwarding the contract acceptance to the supplier identified in the contract acceptance.

24. A computer implemented method of invoicing a tariff recipient for the provision of a product or service, the method comprising establishing a contract with a tariff recipient by a method according to claim 23; monitoring consumption of the product or service during a contract period; and invoicing the tariff recipient in accordance with the tariff previously supplied to the tariff recipient in step a) and the monitored consumption.

25. The method of claim 1, wherein the product or service comprises electrical power.

26. A computer system, comprising: a computer readable medium carrying a computer program, the computer program being configured to carry out the method of claim 1.

27. A program product comprising:
   a computer readable medium carrying a computer program, the computer program being configured to carry out the method of claim 1.

28. A computer implemented method of obtaining a tariff, the method comprising the steps of:
   a) transmitting, by one or more computers, a first load curve to a central processor, the first load curve being indicative of expected variations in consumption of a product or service expected over time;
   b) receiving, by the one or more computers, a first tariff from the central processor, the first tariff being associated with the first load curve;
   c) transmitting, by the one or more computers, a second load curve to the central processor, the second load curve being indicative of expected variations in consumption of the product or service over time;
   d) receiving by the one or more computers, a second tariff from the central processor, the second tariff being associated with the second load curve;
   e) selecting, by the one or more computers, the first tariff or the second tariff; and
   f) transmitting, by the one or more computers, a contract acceptance, the contract acceptance indicating which tariff has been accepted in step e).

29. A computer implemented method of invoicing for the provision of a product or service, the method comprising:
   a) monitoring consumption of the product or service;
   b) invoicing, by the one or more computers, in accordance with the monitored consumption and a tariff;
   c) calculating, by the one or more computers, an expected profit value in accordance with the monitored consumption;
   d) calculating, by the one or more computers, an actual profit value in accordance with the monitored consumption;
   e) making, by the one or more computers, a surcharge if the expected profit value exceeds the actual profit value; and
   f) making, by the one or more computers, a refund if the actual profit value exceeds the expected profit value.

30. The method of claim 29, further comprising receiving a load curve, the load curve being indicative of expected variations in consumption of the product or service over time, wherein the expected profit value is calculated in step d) in accordance with the received load curve.

31. Apparatus for supplying a tariff to a tariff recipient, the apparatus comprising:
   one or more computers, the one or more computers comprising the following elements:
   a) means for receiving one or more cost curves from one or more suppliers, each cost curve being indicative of variations in the cost of a product or service expected by a respective associated supplier over time;
   b) means for receiving a load curve, the load curve being indicative of expected variations in consumption of the product or service over time;
   c) means for calculating a tariff from the received load curve and the received cost curve in accordance with a predetermined algorithm; and
   d) means for transmitting the calculated tariff to the tariff recipient.

* * * * *